US008370018B2

(12) United States Patent
Andreasen et al.

(10) Patent No.: US 8,370,018 B2
(45) **Date of Patent: *Feb. 5, 2013**

(54) AUTOMOTIVE DIAGNOSTIC PROCESS

(75) Inventors: Keith Andreasen, Huntington Beach, CA (US); Robert Madison, Corona, CA (US); Ieon Chen, Laguna Hills, CA (US)

(73) Assignee: Innova Electronics, Inc., Irvine, CA (US)

( * ) Notice: Subject to any disclaimer, the term of this patent is extended or adjusted under 35 U.S.C. 154(b) by 401 days.

This patent is subject to a terminal disclaimer.

(21) Appl. No.: 12/715,181

(22) Filed: Mar. 1, 2010

(65) Prior Publication Data

US 2010/0174446 A1 Jul. 8, 2010

Related U.S. Application Data

(63) Continuation-in-part of application No. 11/823,757, filed on Jun. 28, 2007, now Pat. No. 8,019,503.

(51) Int. Cl.
*G01M 17/00* (2006.01)

(52) U.S. Cl. ..................... 701/31.6; 701/29.1; 701/30.5; 701/31.4; 701/31.7; 701/31.8; 340/438; 340/439

(58) Field of Classification Search ........................ None
See application file for complete search history.

(56) References Cited

U.S. PATENT DOCUMENTS 2,960,654 A 11/1960 Nelson
3,646,438 A 2/1972 Staff
4,112,748 A 9/1978 Walley
4,176,315 A 11/1979 Sunnarborg
4,207,611 A 6/1980 Gordon
4,404,639 A 9/1983 McGuire et al.
4,684,896 A 8/1987 Weishaupt
4,689,573 A 8/1987 Hilmer
4,859,932 A 8/1989 Whitley
4,884,033 A 11/1989 McConchie Sr.
5,003,478 A 3/1991 Kobayashi et al.
5,005,129 A 4/1991 Abe et al.
5,032,791 A 7/1991 Bates, Jr.
5,107,428 A 4/1992 Bethencourt et al.
5,157,708 A 10/1992 Garthwaite et al.
5,170,125 A 12/1992 Bates, Jr.
5,214,582 A 5/1993 Gray
5,247,245 A 9/1993 Nelson
5,278,508 A 1/1994 Bowman
5,285,163 A 2/1994 Liotta
5,359,290 A 10/1994 Cervas
5,394,093 A 2/1995 Cervas
5,400,018 A 3/1995 Scholl et al.
5,481,906 A 1/1996 Nagayoshi et al.
5,491,418 A 2/1996 Alfaro et al.
5,506,772 A 4/1996 Kubozono et al.
5,519,397 A 5/1996 Chapatot et al.

(Continued)

*Primary Examiner* — Khoi Tran
*Assistant Examiner* — Johnathan L Sample
(74) *Attorney, Agent, or Firm* — Stentina Brunda Garred & Brucker

(57) ABSTRACT

A method of processing vehicle diagnostic data is provided for identifying likely vehicle fix(s) associated with a diagnostic data, and identifying a repair procedure(s) for correcting the likely fix(s). The process receiving vehicle diagnostic data from a vehicle onboard computer at a remote diagnostic database, the database being arranged to map vehicle diagnostic data to possible vehicle fix(s). The possible vehicle fix(s) are prioritized in accordance with ranked matches of the received diagnostic data to combinations of diagnostic data stored in a prior experience database. The prior experience database having an identified fix associated with each stored combination of diagnostic data. The fix associated with the highest ranked combination of diagnostic data is identified as the most likely fix. The most likely fix is mapped to a vehicle repair database, the most likely fix being directly mapped to an associated repair procedure for repairing the most likely fix.

13 Claims, 4 Drawing Sheets

U.S. PATENT DOCUMENTS

| | | | | |
|---|---|---|---|---|
| 5,532,927 | A | 7/1996 | Pink et al. | |
| 5,541,840 | A | 7/1996 | Gurne et al. | |
| 5,631,831 | A * | 5/1997 | Bird et al. | 701/34.4 |
| 5,635,841 | A | 6/1997 | Taylor | |
| 5,657,233 | A | 8/1997 | Cherrington et al. | |
| 5,758,300 | A | 5/1998 | Abe | |
| 5,875,413 | A | 2/1999 | Vinci | |
| 5,916,286 | A | 6/1999 | Seashore et al. | |
| 5,935,180 | A | 8/1999 | Fieramosca et al. | |
| 6,021,366 | A | 2/2000 | Fieramosca et al. | |
| 6,061,638 | A | 5/2000 | Joyce | |
| 6,097,998 | A | 8/2000 | Lancki | |
| 6,141,608 | A * | 10/2000 | Rother | 701/29.6 |
| 6,225,898 | B1 | 5/2001 | Kamiya et al. | |
| 6,263,265 | B1 | 7/2001 | Fera | |
| 6,263,268 | B1 * | 7/2001 | Nathanson | 701/31.5 |
| 6,263,322 | B1 * | 7/2001 | Kirkevold et al. | 705/400 |
| 6,295,492 | B1 | 9/2001 | Lang et al. | |
| 6,314,422 | B1 | 11/2001 | Barker et al. | |
| 6,330,499 | B1 | 12/2001 | Chou et al. | |
| 6,359,422 | B1 | 3/2002 | Henningson et al. | |
| 6,370,454 | B1 | 4/2002 | Moore | |
| 6,389,337 | B1 * | 5/2002 | Kolls | 701/31.6 |
| 6,434,455 | B1 | 8/2002 | Snow et al. | |
| 6,459,969 | B1 | 10/2002 | Bates et al. | |
| 6,473,659 | B1 * | 10/2002 | Shah et al. | 700/79 |
| 6,535,802 | B1 | 3/2003 | Kramer | |
| 6,594,579 | B1 | 7/2003 | Lowrey et al. | |
| 6,604,033 | B1 | 8/2003 | Banet et al. | |
| 6,611,740 | B2 | 8/2003 | Lowrey et al. | |
| 6,636,790 | B1 * | 10/2003 | Lightner et al. | 701/31.5 |
| 6,680,675 | B1 | 1/2004 | Suzuki | |
| 6,687,584 | B2 | 2/2004 | Andreasen | |
| 6,701,233 | B2 | 3/2004 | Namaky et al. | |
| 6,718,425 | B1 | 4/2004 | Pajokowski et al. | |
| 6,732,031 | B1 * | 5/2004 | Lightner et al. | 701/31.4 |
| 6,738,696 | B2 | 5/2004 | Oi | |
| 6,771,073 | B2 | 8/2004 | Henningson et al. | |
| 6,807,469 | B2 * | 10/2004 | Funkhouser et al. | 701/31.8 |
| 6,823,243 | B2 | 11/2004 | Chinnadurai et al. | |
| 6,832,141 | B2 | 12/2004 | Skeen et al. | |
| 6,925,368 | B2 * | 8/2005 | Funkhouser et al. | 701/31.5 |
| 6,928,349 | B1 | 8/2005 | Namaky et al. | |
| 6,940,270 | B2 | 9/2005 | Chen | |
| 6,941,203 | B2 | 9/2005 | Chen | |
| 6,947,816 | B2 | 9/2005 | Chen | |
| 6,957,133 | B1 * | 10/2005 | Hunt et al. | 701/32.4 |
| 7,012,512 | B2 | 3/2006 | St. Denis | |
| 7,073,714 | B2 | 7/2006 | Namaky et al. | |
| 7,085,680 | B2 | 8/2006 | Huang | |
| 7,209,860 | B2 * | 4/2007 | Trsar et al. | 702/183 |
| 7,590,476 | B2 * | 9/2009 | Shumate | 701/31.6 |
| 7,684,908 | B1 * | 3/2010 | Ogilvie et al. | 701/29.6 |
| 2001/0053983 | A1 | 12/2001 | Reichwein et al. | |
| 2002/0007237 | A1 * | 1/2002 | Phung et al. | 701/33 |
| 2002/0016655 | A1 | 2/2002 | Joao | |
| 2002/0156692 | A1 | 10/2002 | Squeglia et al. | |
| 2002/0193925 | A1 * | 12/2002 | Funkhouser et al. | 701/33 |
| 2003/0060953 | A1 * | 3/2003 | Chen | 701/33 |
| 2003/0171111 | A1 * | 9/2003 | Clark | 455/414.1 |
| 2003/0177417 | A1 * | 9/2003 | Malhotra et al. | 714/42 |
| 2004/0044454 | A1 * | 3/2004 | Ross et al. | 701/33 |
| 2004/0172177 | A1 * | 9/2004 | Nagai et al. | 701/29 |
| 2004/0227523 | A1 | 11/2004 | Namaky | |
| 2005/0021294 | A1 * | 1/2005 | Trsar et al. | 702/183 |
| 2005/0060070 | A1 * | 3/2005 | Kapolka et al. | 701/29 |
| 2005/0143882 | A1 * | 6/2005 | Umezawa | 701/29 |
| 2005/0203683 | A1 * | 9/2005 | Olsen et al. | 701/35 |
| 2006/0041348 | A1 | 2/2006 | Liebl et al. | |
| 2006/0041349 | A1 | 2/2006 | Chinnadurai et al. | |
| 2006/0095230 | A1 * | 5/2006 | Grier et al. | 702/183 |
| 2006/0161313 | A1 * | 7/2006 | Rogers et al. | 701/1 |
| 2007/0005201 | A1 | 1/2007 | Chen | |
| 2009/0006476 | A1 * | 1/2009 | Andreasen et al. | 707/104.1 |

* cited by examiner

AUTOMOTIVE DIAGNOSTIC PROCESS

CROSS-REFERENCE TO RELATED APPLICATIONS

This application is a continuation-in-part of application Ser. No. 11/823,757, filed Jun. 28, 2007, now U.S. Pat. No. 8,019,503 which is herein incorporated in its entirety by reference.

STATEMENT RE: FEDERALLY SPONSORED RESEARCH/DEVELOPMENT

Not Applicable

BACKGROUND

The present invention relates to vehicle diagnostic and repair services and, more particularly, to an on-line system for integrating the analysis of vehicle diagnostic information, identifying a likely diagnosis from such information.

For many years, automotive vehicles have included diagnostic systems that are electronic control modules and diagnostic systems for monitoring the status of associated automotive equipment. Over time, the diagnostic systems have become more sophisticated, and the information conveyed by the diagnostic systems have become more standardized, assisting in the evaluation of vehicle conditions and identifying appropriate repair procedures.

Contemporary automotive control systems include electronic control modules (ECM's) that generate signals representative of the status of various monitors and other automotive devices, as well as providing real-time data concerning the operation of those devices. When a system operates outside of defined limits, the ECM typically generates diagnostic data or information, such as diagnostic trouble codes, PIDs or other signals (collectively referred to as diagnostic trouble codes or DTCs). The DTCs are typically stored in the ECM memory, accessible using tools such as code readers or scan tools. Such contemporary tools include the Innova Model 3110 Scan Tool and the Innova Model 3100 Code Reader.

In some cases, the scan tool or code reader will simply identify the alphanumeric DTC, and the user may refer to an accompanying manual, or on-line resource, to identify an associated descriptor. In other cases the scan tool code reader may also display the descriptor associated with the DTC and other information.

However, an indication from a scan tool or code reader that a particular system or device is operating outside of defined limits does not necessarily identify the nature of the underlying problem. In some cases DTCs referring to one automotive system may be symptomatic of a problem, or problems arising in a completely different system. The presence of one or more DTCs may, therefore, be indicative of a number of different possible problems, and not necessarily associated with a readily identified cause.

Over time, experienced mechanics learn to correlate certain DTCs, or combinations of DTCs, with specific underlying problems that need to be remedied. However, with so many different vehicles to be repaired, and different hardware/software configurations within different vehicles, the process of diagnosing a vehicle condition from DTCs and other diagnostic information may be challenging, requiring extensive analysis of the mechanical, electrical, and software systems of the particular vehicle being serviced. This obviously may be a cumbersome process that requires considerable effort and expense.

In order to facilitate the analysis of vehicle diagnostic information, various bulletin boards and other websites have been established where mechanics may post information identifying the vehicle and associated diagnostic information. Other mechanics may then reply, indicating if they have encountered similar circumstances and, if so, what was found to be the underlying vehicle problem. Over time that information gathered at technical support centers responding to diagnostic conditions can be collected and made available to subscribing mechanics.

Conventionally, the mechanic would then have access to one or more possible solutions, i.e., repairs for the vehicle condition(s) that generated the diagnostic information. The mechanic would still need to identify the most likely condition and then identify the appropriate solution to repair that vehicle condition(s). Such repair procedures may be identified by reference to appropriate vehicle manuals, or sources such as Chilton's™ Automotive Repairs, a well-known source for vehicle repair procedures, which may also be found online. Once the mechanic obtains access to the website, e.g., by purchasing a subscription, the mechanic may page or scroll through the online manual(s) to locate specific repair procedure, and then commence that repair. However, accessing a repair procedure website and locating an identified repair introduces further delays and uncertainties in the process, and may require expensive subscriptions that are infrequently utilized. Consequently, while online information respecting automotive diagnostics and repair procedures is available to mechanic, the conventional process for accessing and evaluating possible diagnostic solutions, and accessing the specific procedure necessary to repair the identified solution, may be uncertain, cumbersome, expensive and introduce undue delay, as the mechanic goes from one resource to another in an effort to identify and repair the vehicle condition.

The present invention is directed to a system and technique for integrating informational resources available to the mechanic, so that the mechanic may be readily provided with information identifying both the like vehicle condition that gives rise to the diagnostic information, and the procedure(s) useful to remedy that condition, without the need to separately access and scroll through multiple websites or reference sources related to identifying and remedying the underlying vehicle condition.

BRIEF SUMMARY

A method of processing vehicle diagnostic data is provided for identifying likely vehicle fix(s) associated with a diagnostic data, and identifying a repair procedure(s) for correcting the likely fix(s). The process receiving vehicle diagnostic data from a vehicle onboard computer at a remote diagnostic database, the database being arranged to map vehicle diagnostic data to possible vehicle fix(s). The possible vehicle fix(s) are prioritized in accordance with ranked matches of the received diagnostic data to combinations of diagnostic data stored in a prior experience database. The prior experience database having an identified fix associated with each stored combination of diagnostic data. The fix associated with the highest ranked combination of diagnostic data is identified as the most likely fix. The most likely fix is mapped to a vehicle repair database, the most likely fix being directly mapped to an associated repair procedure for repairing the most likely fix.

In one embodiment the step of prioritizing possible vehicle fix(s) comprises comparing combinations of diagnostic trouble codes received from the vehicle onboard computer to stored combinations of diagnostic trouble codes in the prior experience database. The stored combination of diagnostic trouble codes ranked highest in relation to the diagnostic trouble codes received from the vehicle onboard computer is thereby identified. The fix associated with the highest ranked stored combination of diagnostic trouble codes is identified as the most likely fix.

The step of prioritizing possible vehicle fix(s) may be implemented based on prioritization rules such as identifying the stored combination of digital trouble codes which include each of the diagnostic trouble codes received from the vehicle onboard computer, with a minimum of additional diagnostic trouble codes.

Prioritization steps may also include identifying stored combinations of digital trouble codes, and associated fix(s), having the highest successful fix count. Additional prioritization rules may include prioritization of stored combinations of diagnostic trouble codes in accordance with the cost of repair of the associated fix.

In one embodiment, the method further includes accessing an automotive repair procedures database for repairing a range of automotive conditions, linking the most likely fix to a selected repair procedure(s) in the repair procedures database, the selected repair procedure(s) being effective to repair the most likely fix. The selected repair procedure is then accessed.

The vehicle diagnostic data and vehicle identification information may be wirelessly uploaded from a hand held scan tool to a personal computer, cell phone or wireless onboard communication device adapted to access the remote diagnostic database via the World Wide Web.

In one embodiment the communication path between the scan tool or onboard communication device is implemented via a blue tooth local communication network or the equivalent.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The description below is given by way of example, and not limitation. Given the disclosure set forth herein, one skilled in the art could devise variations that are within the scope and spirit of the disclosed invention. Further, it is to be understood that the various features of the embodiments disclosed herein can be used alone, or in varying combinations with each other and are not intended to be limited to the specific combination described herein. Thus, the scope of the claims is not to be limited by the illustrated embodiments.

Figure 1:
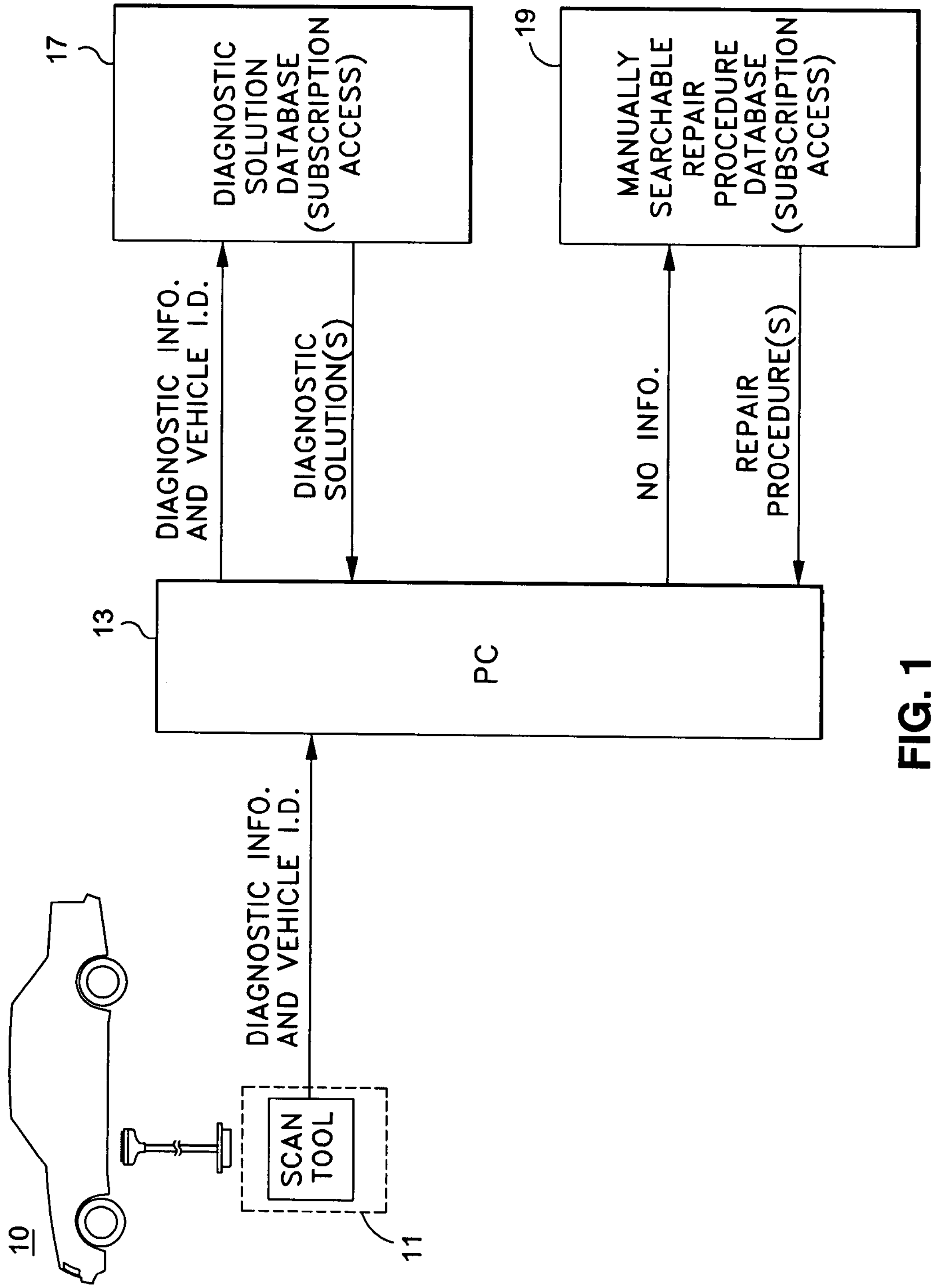
FIG. 1 (PRIOR ART)
FIG. 1 is a block diagram illustrating the operation of prior art diagnostic procedures.

FIG. 1 illustrates a prior art technique for evaluating vehicle diagnostic information, and for identifying potential repair procedures. In accordance with such techniques, hand held scan tool or code reader 11 is engaged to a diagnostic port on vehicle 10 to receive vehicle diagnostic information, such as DTC's status information, etc. Depending upon the particular vehicle, the diagnostic information may be accompanied by vehicle identification information, such as the year/make/model of the vehicle. That information is communicated to a device, such as personal computer 13, where it can be displayed and further processed.

Diagnostic solution database 17 may be separate from the personal computer, PC 13, or may reside within PC 13. Where the diagnostic solution database 17 is separate, it may be remotely connected to PC 13, via the world wide web or other communication means. Access to the diagnostic solution database 17 may be freely available to all users, or may be restricted in use, e.g., accessible on a paid subscription basis, or limited to compatibility only with specific scan tools.

In response to receipt of diagnostic information from PC 13, the diagnostic solution database provides information directly associated with the diagnostic trouble code or other information. That information would typically include information describing the substance of the diagnostic information that conforms to a specific DTC, e.g., a DTC descriptor. In some cases, database 17 would also provide some information regarding a possible diagnostic solution, or fix, directly associated with each diagnostic trouble code. Such fixes or diagnostic solutions are communicated to PC 13 where they can be viewed by a user.

A repair procedure for implementing each fix identified by database 17 may be identified by searching repair procedure database 19. Database 19 may be a freely accessible database, or a database restricted to subscription access. In practice, a user accesses the repair procedure database 19, typically through a main page and index, which is used to search for the appropriate procedure(s) associated with repairing each fix identified by database 17. The user would therefore look at the identified fix, and then locate the repair procedure associated with that fix. Where multiple DTC's are identified in the diagnostic information from vehicle 10, the process may be laborious back and forth between looking at possible fixes identified by the diagnostic solution database 17, and accessing associated repair procedures in repair procedure database 19. Diagnostic solution database 17 is not typically operative to evaluate fixes associated with multiple digital trouble codes, or to prioritize possible fixes that could arise in relation to various combinations of digital trouble codes. Moreover, the fixes identified by database 17 may be addressing only the symptoms associated with the DTC's, rather than the underlying cause. In such cases, endeavoring to implement repair procedures associated with each individual DTC may be little more than an exercise in futility as the DTC may return in short order after the repair is complete.

Figure 2:
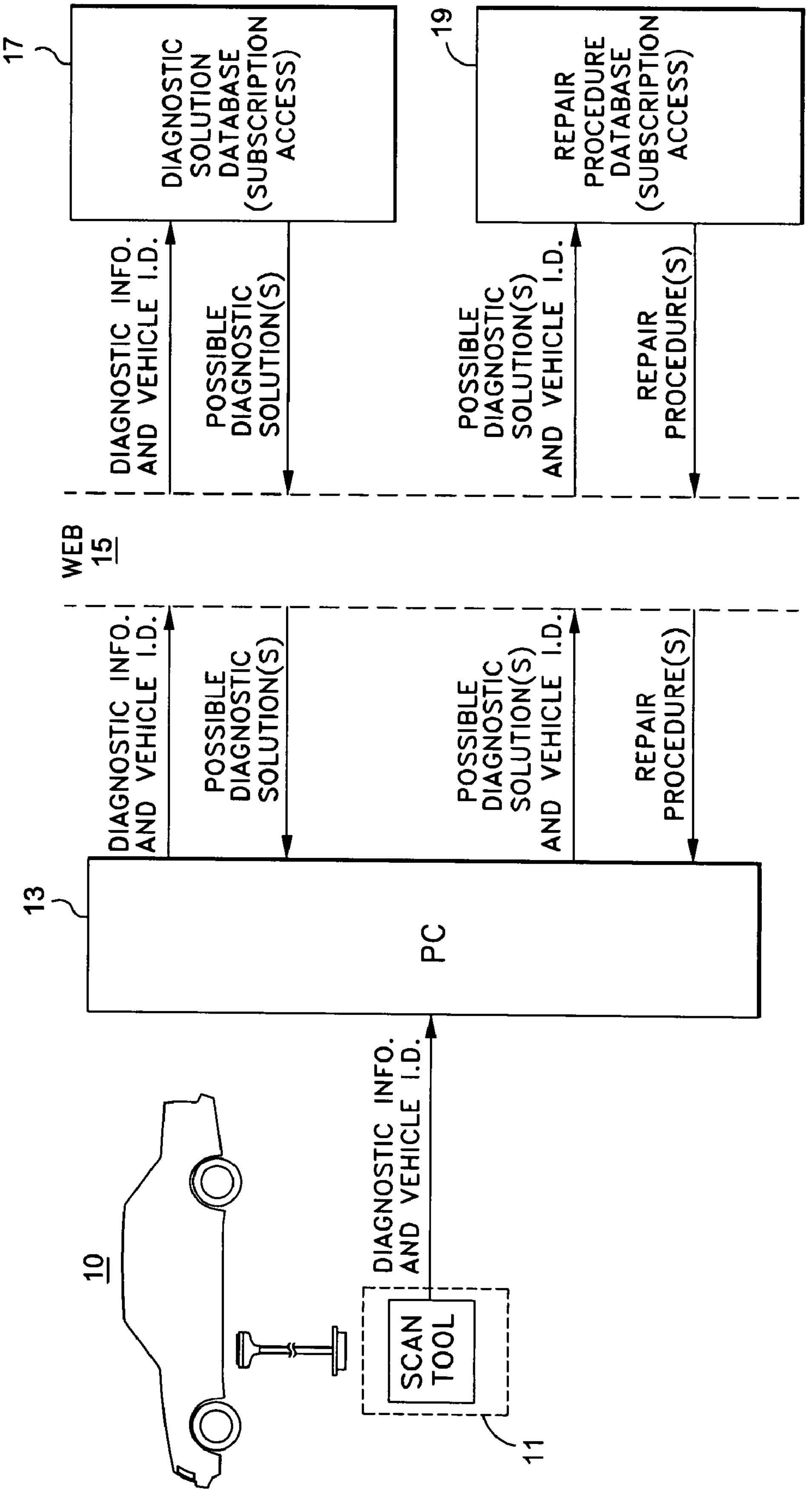
FIG. 2 (PRIOR ART)
FIG. 2 is another block diagram illustrating the operation of prior art diagnostic procedures.

FIG. 2 illustrates an alternate prior art configuration wherein the diagnostic subscription database 17 and the repair procedure database 19 are accessible to PC 13 via the world wide web 15. Again, vehicle diagnostic information is communicated through diagnostic subscription database 17 and possible diagnostic fixes, or solutions, may be individually derived for each DTC and communicated to PC 13.

Each possible diagnostic solution may be communicated to the repair procedure database 19, where it could be separately mapped to a repair procedure. In practice, the diagnostic solution and accompanying vehicle identification information could be parsed or otherwise mapped to access a repair procedure within database 19 that is appropriate to the particular diagnostic trouble code, or associated fix. The identified repair procedure can then be communicated to the user at PC 13.

As with the procedure described in relation to FIG. 1, the procedure described in relation to FIG. 2 does not provide for fixes or diagnostic solutions associated with various combinations of DTC's or other diagnostic information, but does allow direct linking from the DTC's to the associated repair procedure. As such, the diagnostic solutions are most useful in accessing repair procedures associated with clear and unambiguous diagnostic information. The procedure is, therefore, of limited value in relation to more ambiguous diagnostic information, i.e., DTC's that could arise in relation to more than one diagnostic condition, and could be repaired by more than one repair procedure. The procedure may, therefore, be of marginal use to users having little automotive repair background, who typically need a clear indication of the fix to be repaired. Users having a more significant automotive repair background may find information from to the databases useful as resources, but may find the process inefficient and unreliable in relation to defects associated with combinations of DTC's.

Figure 3:
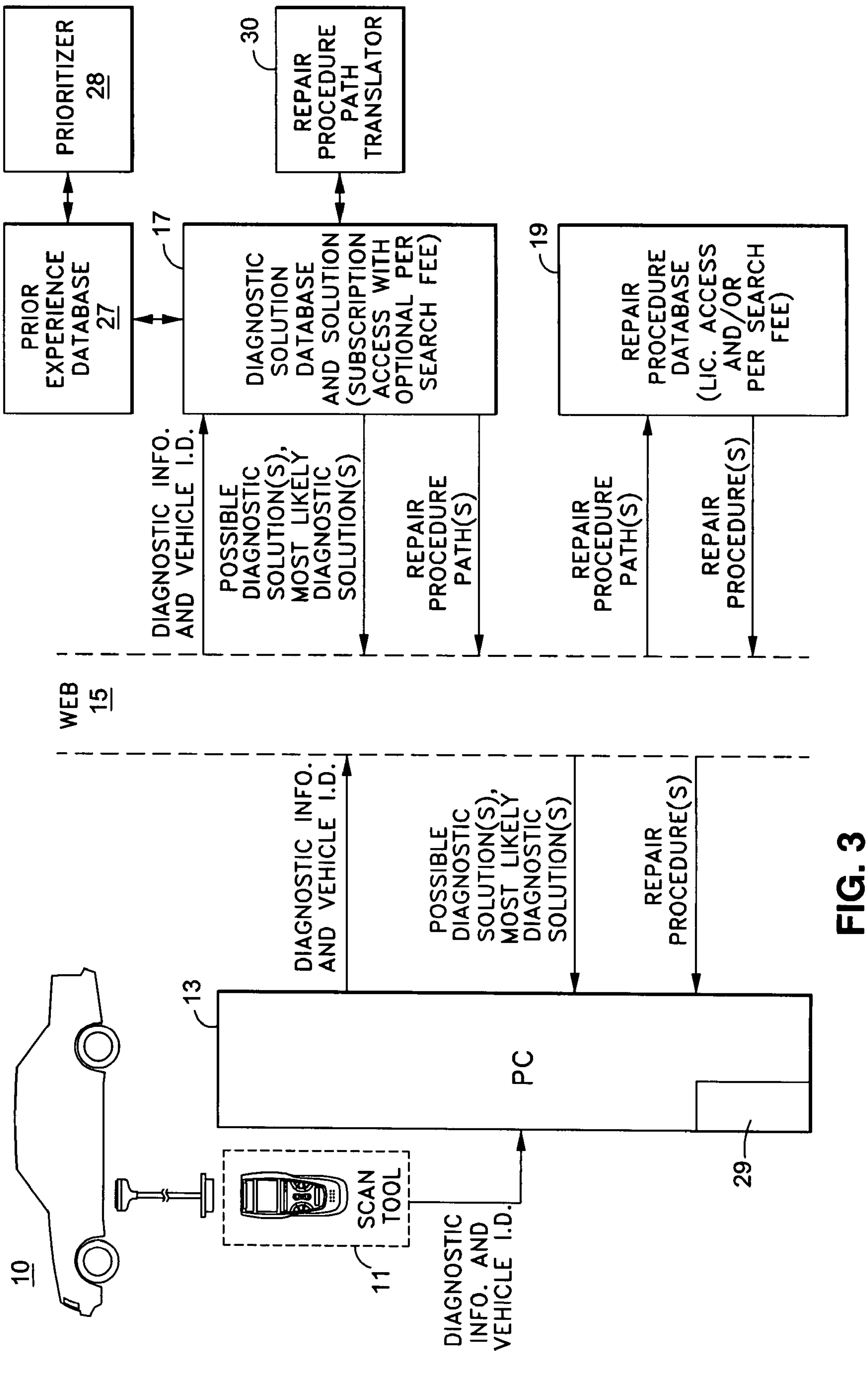
FIG. 3 illustrates one embodiment of the vehicle diagnostic process and system, in accordance with the present invention.

FIG. 3 illustrates a process and configuration in accordance with one aspect of the present invention. As discussed in relation to the preceding figures, diagnostic information from vehicle 10 may be uploaded to scan tool or code reader 11, to be communicated to PC 13, which may be implemented as a personal computer that functions independent of the vehicle 10, or a vehicle onboard communication device adapted to wirelessly access the diagnostic database 17 via the World Wide Web. Such communication from the scan tool 11 may be facilitated by direct wire connection of the scan tool 11 to the PC 13, or by wireless connection from vehicle 10 or scan tool 11 to PC 13. In one embodiment a wireless connection path is formed from the scan tool 11 to the World Wide Web, via a cell phone, is described in U.S. patent application Ser. No. 11/172,293 for Cell Phone Based Vehicle Diagnostic System, assigned to the common assignee, the contents of which are incorporated herein by reference. In another embodiment the scan tool 11 or onboard computer may communicate diagnostic information to an onboard communication device adapted to access the World Wide Web via a user interface integrated into an automotive display screen. The diagnostic information, which may also include vehicle identifying information, may in turn be communicated to a remote diagnostic solution database 21 via the world wide web 15. The diagnostic solution database 21 can operate to translate DTC's to descriptors, and can also define a repair path to a particular location in repair procedure database 19, wherein an associated repair procedure is described.

Where the diagnostic information includes combinations of digital trouble codes and/or other diagnostic data, a prior experience database, such as prior experience database 27, can be accessed to identify similar stored combinations of diagnostic trouble codes, along with associated information, such as the fix(s) associated with such combination of DTC's, the successful diagnosis count associated with each such fix and the cost associated with each such fix. As explained more fully below, the information from the prior experience database is prioritized by the fix prioritizer 20 in accordance with prioritization rules described below. In general, the fix prioritization rules evaluate facts such as whether the stored combinations of DTC's include the same DTC's received from the vehicle 10; whether the stored combinations of DTC's include additional DTC's, other than DTC's from the vehicle 10; the successful diagnosis or fix rate associated with each stored combination of DTC's and the associated fix. Evaluation of such factors, in accordance with the scenarios set forth below, allows the identification of a most likely fix associated with the received DTC's and vehicle identification.

In the embodiment illustrated at FIG. 3, the diagnostic solution database 21 is connected to repair procedure path translator 30 wherein the most likely fix, as determined by prioritizer 28, is parsed or otherwise mapped to a specific portion of repair procedure database 19 which defines the procedure for implementing repair of the most likely fix. The repair procedure path is communicated to repair procedure database 19, via the world wide web 15, to allow a user to access the repair procedure(s) found to be most appropriate to correct the defects associated with the diagnostic information output from vehicle 10. Information identifying the particular vehicle may also be communicated to the repair procedure database 19 to facilitate mapping at the database 19, or may already be factored into the repair procedure path identified by repair procedure path translator 30.

Figure 4:
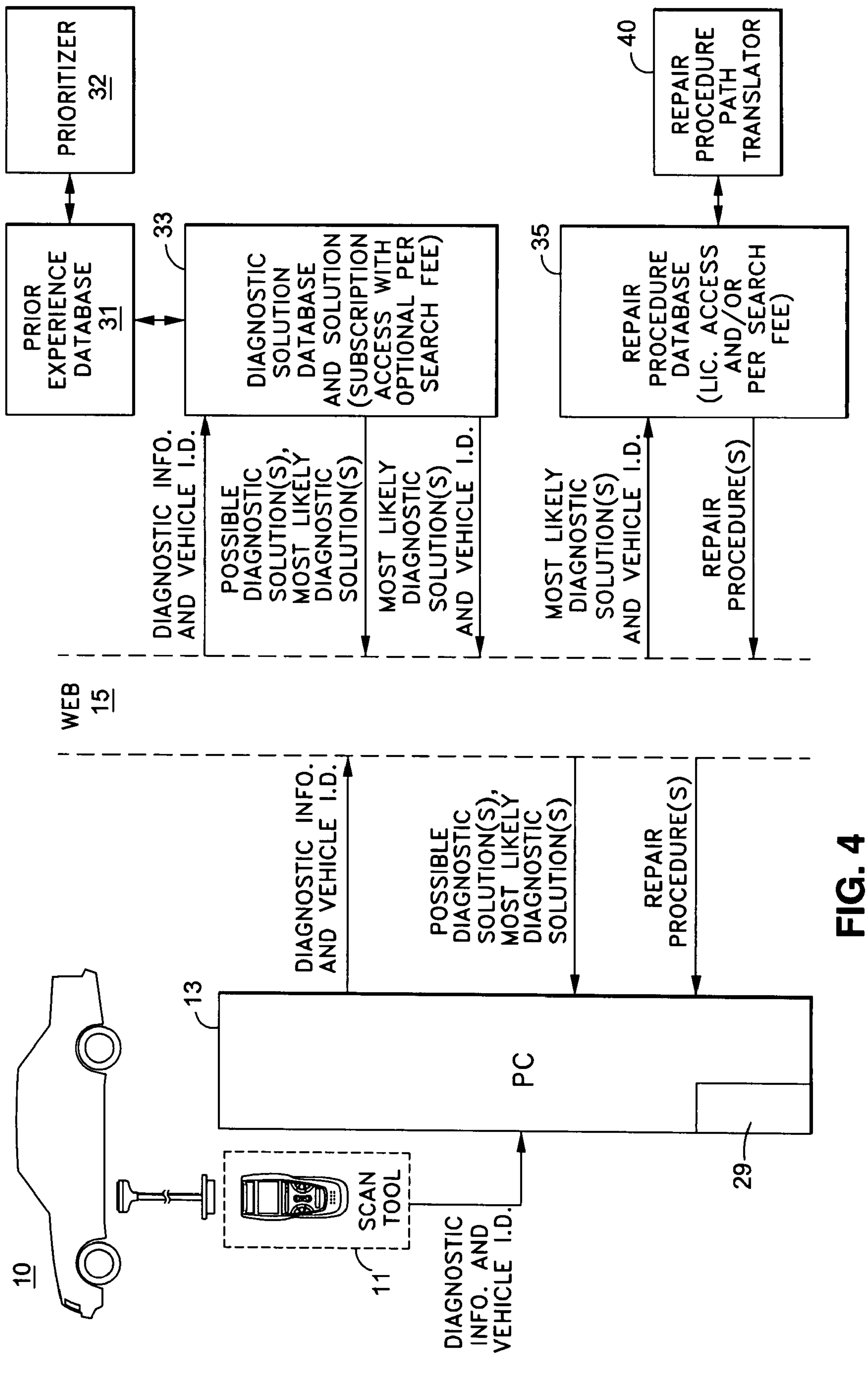
FIG. 4 illustrates a second embodiment of the vehicle diagnostic process and system, in accordance with the present invention.

FIG. 4 illustrates an alternate implementation of the present invention. The primary distinction in relation to the implementation shown in FIG. 4 concerns the location wherein the repair procedure path is defined. In the embodiment of FIG. 4, the prioritizer 32, in cooperation with prior experience database 31, outputs the most likely fix, which is not mapped to a repair procedure path at database 35. Instead, repair procedure path translator 40 operates to map the most likely diagnostic fix(s) to a repair procedure path within repair procedure database 35. In such a way, definition of the appropriate repair procedure path may be affected by administrators of the repair procedure database, who are likely to have greater hands on knowledge of the repair procedure database, and its periodic updates. In practice, information communicated from the diagnostic solution database 33 to the repair procedure database 35 may, therefore, include vehicle identifying information, to facilitate mapping to the appropriate repair procedure in database 35.

Commercial operation of the present invention may incorporate various types of business features, allowing use of the present invention by multiple types of users, on differing terms. In one such implementation PC 13 may be implemented as a kiosk allowing users to input information from a scan tool into the kiosk, whereupon it is communicated to the databases and operated on as described above. The kiosk may additionally incorporate an e-commerce terminal for effecting payment for different features. Those features may include loaning a compatible scan tool for use in accessing diagnostic information from the vehicle 10 and communicating that information to compatible input ports in the kiosk. The e-commerce portal 29 may also facilitate access to the diagnostic solution database 21, either on a subscription basis or on a per search fee. A user, operating via a kiosk, a home personal computer, or some other communication mechanism, and therefore pay a fee to obtain information from the diagnostic solution database, e.g., possible fix and/or or the most likely fix(s). For an additional fee a user may further obtain access, on a per use basis, to the repair procedure(s) associated with the possible fix and/or the most likely fix(s).

Set forth below are tables representing scenarios 1-11 illustrating the manner in which possible diagnostic solutions, or fixes, are prioritized in accordance with one embodiment of the present invention. As described below, the present invention operates to prioritizing, or ranking, fixes in accordance with multiple factors. Those factors may include correspondence to the specific stored DTC's, the absence of additional, non-conforming DTC's, the successful fix count associated with each potential fix, and the cost associated with each fix. The weight given to those factors is described below in relation to the various scenarios.

Scenario 1 illustrates a simple scenario wherein a single primary code, and no secondary code output from the vehicle onboard computer, and the experience database identifies only one fix associated with that DTC. That fix, i.e., Fix 1, is therefore identified as the most likely fix to repair the vehicle condition associated with the identified DTC.

Scenario 1

| | | Fix 1 | Fix 2 | Fix 3 | Fix 4 | Fix 5 |
|---|---|---|---|---|---|---|
| P.C. | P0101 | P0101 | | | | |
| S.C.(s) | | | | | | |
| Count: | | | | | | |
| Fix | | 1 | | | | |
| Probability: | | | | | | |

Scenario 2 differs in that experience database identifies three different fixes associated with the same DTC. However, each fix has a different successful fix count associated therewith. Under such circumstances the fix having the highest success count is identified as the most likely fix, i.e., Fix 1.

Scenario 2

| | | Fix 1 | Fix 2 | Fix 3 | Fix 4 | Fix 5 |
|---|---|---|---|---|---|---|
| P.C. | P0101 | P0101 | P0101 | P0101 | | |
| S.C.(s) | | | | | | |
| Count: | | 100 | 1 | 30 | | |
| Fix | | 1 | 3 | 2 | | |
| Probability: | | | | | | |

Scenario 3 illustrates a condition wherein two DTC's are identified and three fixes are associated with the same two DTC's. A fourth fix is identified with one of the two DTC's, and has a higher successful fix count. Under this situation the most likely fix is identified as the fix having the highest success count of the two fixes conforming to both DTC's, i.e., Fix 2.

Scenario 3

| | | Fix 1 | Fix 2 | Fix 3 | Fix 4 | Fix 5 |
|---|---|---|---|---|---|---|
| P.C. | P0101 | P0101 | P0101 | P0101 | P0101 | |
| S.C.(s) | P0102 | P0102 | P0102 | P0102 | | |
| Count: | | 3 | 20 | 10 | 100 | |
| Fix | | 3 | 1 | 2 | 4 | |
| Probability: | | | | | | |

Scenario 4 presents a situation where no fix is identified which conforms to all four DTC's output from the vehicle onboard computer. Two possible fixes each conform to the same number of DTC's, though one has a higher successful fix count. Under those circumstances, the most likely fix is identified as the fix having the highest count, i.e., Fix 2.

Scenario 4

| | | Fix 1 | Fix 2 | Fix 3 | Fix 4 | Fix 5 |
|---|---|---|---|---|---|---|
| P.C. | P0101 | P0101 | P0101 | | | |
| S.C.(s) | P0102 | P0102 | P0102 | | | |
| | P0103 | | | | | |
| | P0104 | | | | | |
| Count: | | 3 | 20 | | | |
| Fix | | 2 | 1 | | | |
| Probability: | | | | | | |

Scenario 5 presents a situation where again no fix conforms to each of the DTC's output from the vehicle onboard computer. The fix conforming to the greatest number of conforming DTC's is selected as the most likely fix, despite the fact that another fix has a higher successful fix count, i.e., Fix 1.

Scenario 5

| | | Fix 1 | Fix 2 | Fix 3 | Fix 4 | Fix 5 |
|---|---|---|---|---|---|---|
| P.C. | P0101 | P0101 | P0101 | | | |
| S.C.(s) | P0102 | P0102 | P0102 | | | |
| | P0103 | P0103 | | | | |
| | P0104 | | | | | |
| Count: | | 3 | 20 | | | |
| Fix | | 1 | 2 | | | |
| Probability: | | | | | | |

Scenario 6 presents a situation where one possible fix conforms to each of the DTC's output from the vehicle onboard computer, though the other possible fix has a much higher successful fix count. Again, the most likely fix is identified as that which conforms to each of the DTC's generated by the onboard computer, notwithstanding the lower fix count, i.e., Fix 1.

Scenario 6

| | | Fix 1 | Fix 2 | Fix 3 | Fix 4 | Fix 5 |
|---|---|---|---|---|---|---|
| P.C. | P0101 | P0101 | P0101 | | | |
| S.C.(s) | P0102 | P0102 | P0102 | | | |
| | P0103 | P0103 | P0103 | | | |
| | P0104 | P0104 | | | | |
| Count: | | 1 | 100 | | | |
| Fix | | 1 | 2 | | | |
| Probability: | | | | | | |

Scenario 7 presents a situation where both possible fixes include the single DTC generated by the vehicle onboard computer. However, one fix also includes additional DTC's which are not output by the vehicle onboard computer. Under those circumstances the highest probability fix is identified as that which conforms most closely to the DTC output from the vehicle onboard computer, without additional DTC's, i.e., Fix 2. This is notwithstanding the higher successful diagnosis count of the fix associated with the additional DTC's.

Scenario 7

| | | Fix 1 | Fix 2 | Fix 3 | Fix 4 | Fix 5 |
|---|---|---|---|---|---|---|
| P.C. | P0101 | P0101 | P0101 | | | |
| S.C.(s) | | P0102 | | | | |
| | | P0103 | | | | |
| | | P0104 | | | | |
| Count: | | 1000 | 1 | | | |
| Fix | | 2 | 1 | | | |
| Probability: | | | | | | |

Scenario 8 presents a situation where two possible fixes again present additional DTC's, beyond that output by the vehicle onboard computer. Again, the most likely fix is identified as the fix having the same DTC's as output from the vehicle onboard computer, without any additional DTC's, i.e., Fix 3. Again, this is notwithstanding the higher successful diagnosis count associated with fixes having additional DTC's.

Scenario 8

| | | Fix 1 | Fix 2 | Fix 3 | Fix 4 | Fix 5 |
|---|---|---|---|---|---|---|
| P.C. | P0101 | P0101 | P0101 | P0101 | | |
| S.C.(s) | P0102 | P0102 | P0102 | P0102 | | |
| | | P0103 | P0103 | | | |
| | | P0104 | P0104 | | | |
| Count: | | 1000 | 500 | 2 | | |
| Fix Probability: | | 2 | 3 | 1 | | |

Scenario 9 presents a situation where three possible fixes are identified, each exactly conforming with the DTC output from the vehicle onboard computer, and each having the same successful diagnosis count associated therewith. Under such circumstances the most likely fix is chosen as the fix having the highest associated fix cost, i.e., Fix 1. In such a way, the user is focused on the highest potential fix cost as a basis to evaluate otherwise equally probable fixes.

Scenario 9

| | | Fix 1 | Fix 2 | Fix 3 | Fix 4 | Fix 5 |
|---|---|---|---|---|---|---|
| P.C. | P0101 | P0101 | P0101 | P0101 | | |
| S.C.(s) | | | | | | |
| Count: | | 50 | 50 | 50 | | |
| Fix Cost: | | $500 | $300 | $150 | | |
| Fix Probability: | | 1 | 2 | 3 | | |

Scenario 10 presents a situation where each of the possible fixes includes only a single DTC corresponding to DTC's generated by the vehicle onboard computer, and wherein the successful diagnosis count of each possible fix is the same. Under those circumstances the most likely fix is identified as that having the highest associated cost of the three possible fixes, i.e., Fix 2.

Scenario 10

| | | Fix 1 | Fix 2 | Fix 3 | Fix 4 | Fix 5 |
|---|---|---|---|---|---|---|
| P.C. | P0101 | P0101 | P0101 | P0101 | | |
| S.C.(s) | P0102 | P0105 | P0115 | P0300 | | |
| | P0103 | P0108 | P0108 | P0301 | | |
| | P0104 | P0110 | P0200 | P0302 | | |
| Count: | | 500 | 500 | 500 | | |
| Cost: | | $225 | $300 | $150 | | |
| Fix Probability: | | 2 | 1 | 3 | | |

Scenario 11 presents a situation where each of the three possible fixes again correlate to only one of the DTC's generated by the vehicle onboard computer, and wherein each fix has three additional DTC's that do not find correspondence with the DTC's generated by the vehicle onboard computer. Under those circumstances the most likely fix is identified as the fix having the highest successful fix count of the three possible fixes, i.e., Fix 1.

Scenario 11

| | | Fix 1 | Fix 2 | Fix 3 | Fix 4 | Fix 5 |
|---|---|---|---|---|---|---|
| P.C. | P0101 | P0101 | P0101 | P0101 | | |
| S.C.(s) | P0102 | P0105 | P0115 | P0300 | | |
| | P0103 | P0108 | P0108 | P0301 | | |
| | P0104 | P0110 | P0200 | P0302 | | |
| Count: | | 1000 | 500 | 2 | | |
| Fix Probability: | | 1 | 2 | 3 | | |

As will be apparent to those of ordinary skill in the art, the techniques described above for identifying the most likely fix of the various possible fixes may be modified in accordance with user preference, without departing from the broader aspects of the present invention. For example, ranking of potential fixes by fix cost may be based on prioritizing the lowest fix cost, rather than the highest fix cost, or the presence of additional DTC's may be prioritized differently. Rankings may also be ordered on the basis of other factors, e.g., on the basis of successful fix count, or listed alphabetically.

What is claimed is:

1. A method of processing vehicle diagnostic data to identify the most likely vehicle fix associated with the diagnostic data, the process comprising:

receiving at a remote database a combined set of vehicle diagnostic data downloaded to a hand held scan tool from a vehicle onboard computer; and prioritizing, in a computer, possible vehicle fix(s) in accordance with ranked matching of the downloaded combined set of diagnostic data to combined sets of diagnostic data stored in a prior experience database, the prior experience database having at least one possible fix associated with each combined set of stored diagnostic data, the possible fix associated with the highest ranked set of stored diagnostic data being identified as the most likely fix.

2. The process as recited in claim 1 wherein the step of prioritizing the possible vehicle fix(s) further comprises the step of identifying the stored set of diagnostic trouble codes having the greatest number of the diagnostic trouble codes that correspond to the set of diagnostic trouble codes downloaded from the vehicle onboard computer, and the stored set of diagnostic trouble codes having the least number of diagnostic trouble codes that do not correspond to the set of diagnostic trouble codes downloaded from the vehicle onboard computer.

3. The process as recited in claim 2 wherein the step of prioritizing possible vehicle fix(s) further comprises the step of identifying the stored set of diagnostic trouble codes having the highest successful fix count associated therewith.

4. The process as recited in claim 2 wherein the step of prioritizing possible vehicle fix(s) further comprises the step of prioritizing the stored set of diagnostic trouble codes having the lowest cost of repair associated therewith.

5. The process as recited in claim 1 further comprising the steps of:

i. accessing an automotive repair procedures database for repairing a range of automotive conditions;

ii. linking the most likely fix(s) to a selected repair procedure(s) in the repair procedures database, the selected repair procedure(s) being effective to implement the most like fix(s); and iii. accessing the selected repair procedure(s) effective to implement the most likely fix(s).

6. The process as recited in claim 1 further comprising the step of communicating the downloaded set of vehicle diagnostic data from a hand held scan tool to a personal computer and then communicating the downloaded set of vehicle diagnostic data from the personal computer to the remote diagnostic database for prioritizing.

7. The process as set forth in claim 5 comprising the step of communicating information concerning the most likely fix(s) and the associated repair procedure to a user.

8. The process as recited in claim 1 wherein the step of prioritizing the possible vehicle fix(s) comprises comparing the set of diagnostic trouble codes downloaded from the vehicle onboard computer with stored sets of diagnostic trouble codes in the prior experience database, and identifying the stored set of diagnostic trouble codes ranked highest in relation to the set of diagnostic trouble codes downloaded from the vehicle onboard computer.

9. The process as recited in claim 1 further comprising the steps of:

communicating the downloaded set of diagnostic data from the scan tool to a personal computer; and communicating the downloaded set of diagnostic data from the personal computer to the remote database.

10. The process as recited in claim 9 wherein the step of communicating the downloaded set of diagnostic data from the scan tool to personal computer comprises wirelessly communicating the downloaded set of diagnostic data from the scan tool to the personal computer.

11. The process as recited in claim 1 further comprising the steps of:

communicating the downloaded set of diagnostic data from the scan tool to a cellphone; and communicating the downloaded set of diagnostic data from the cellphone to the remote database.

12. The process as recited in claim 1 further comprising the steps of:

communicating the downloaded set of diagnostic data from the scan tool to a kiosk; and communicating the downloaded set of diagnostic data from the kiosk to the remote database.

13. The process as recited in claim 1 wherein the downloaded set of vehicle diagnostic data includes vehicle identifying information.

* * * * *